United States Patent [19]
Hubbard

[11] 3,734,245
[45] May 22, 1973

[54] ELECTRIC BRAKE
[75] Inventor: Harold C. Hubbard, Lansing, Mich.
[73] Assignee: Motor Wheel Corporation, Lansing, Mich.
[22] Filed: Oct. 1, 1971
[21] Appl. No.: 185,664

[52] U.S. Cl...................188/163, 192/84 A, 310/77, 188/71.4, 188/250 B
[51] Int. Cl.............................................F16d 65/34
[58] Field of Search ..310/77, 93, 103; 188/163, 162, 188/161, 164; 192/84 R, 84 A

[56] References Cited
UNITED STATES PATENTS

| | | |
|---|---|---|
| 1,601,791 | 10/1926 | Bing..................192/84 A |
| 3,268,044 | 8/1966 | Lippman..............192/84 A |
| 3,003,609 | 10/1961 | Lang...................188/164 X |
| 3,422,942 | 1/1969 | Spencer...............188/163 X |
| 3,446,322 | 5/1969 | Wrensch..............188/163 X |

Primary Examiner—D. F. Duggan
Attorney—Barnes, Kisselle, Raisch & Choate

[57] ABSTRACT

A vehicle electric brake with stationary and axially moveable cores providing a V-shape annular recess receiving an endless belt providing a friction liner releasably urged into firm frictional engagement with the cores by an electromagnet mounted in the stationary core. The moveable core is mounted on a wheel hub for rotation therewith and axial movement with respect to the fixed core to engage the belt between the cores and thereby restrain rotation of a wheel on the hub to stop the vehicle.

11 Claims, 1 Drawing Figure

Patented May 22, 1973
3,734,245
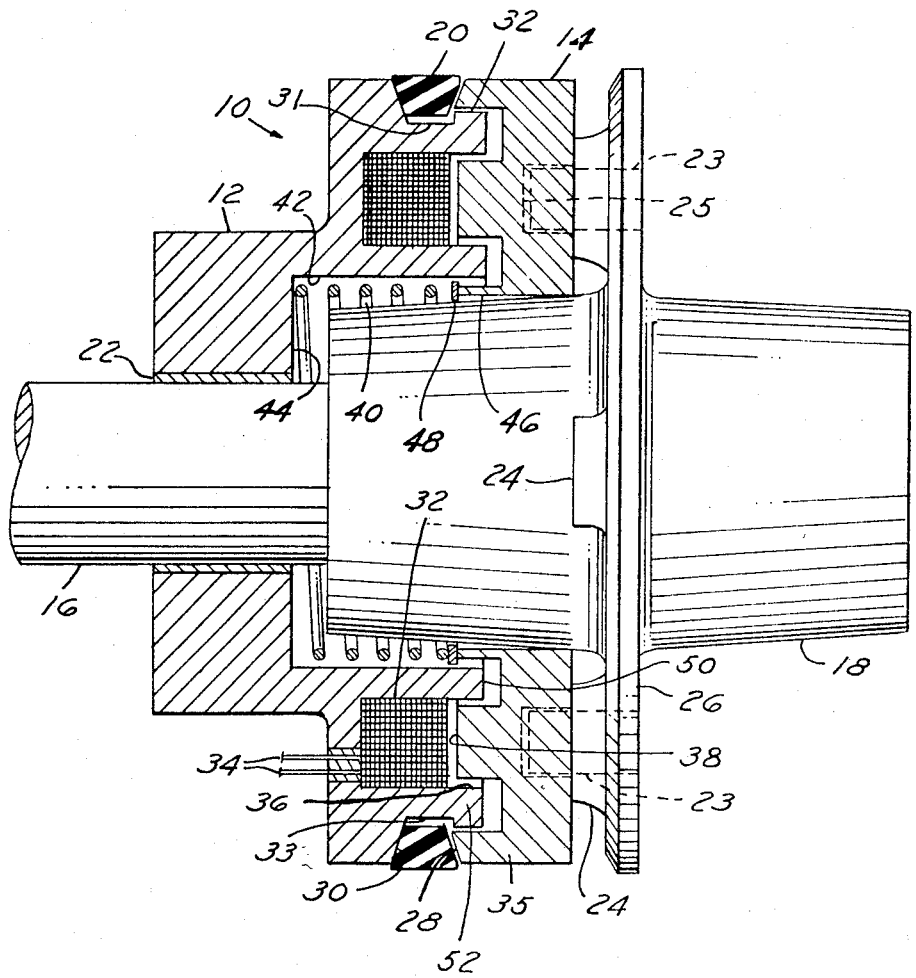

ELECTRIC BRAKE

This invention relates to vehicle braking devices and more particularly to electric brakes suitable for trailers and the like.

Objects of this invention are to provide an electric brake of economical construction and assembly which is substantially maintenance free and highly effective for braking wheeled vehicles such as boat trailers and the like.

These and other objects, features, and advantages of this invention will be apparent from the following description, appended claims, and accompanying drawing which is a side view partially in vertical center section of an electric brake embodying this invention mounted on an axle and hub assembly of a vehicle.

The drawing illustrates an electric brake 10 with a stationary core 12 and a rotary and axially moveable core 14 mounted respectively on an axle 16 and a wheel hub 18 of a trailer (not shown). An endless circular belt 20 with a generally V-shape cross-section is releasably engaged by moveable core 14 to provide a frictional coupling between the cores which retards the rotation of moveable core 14 and associated to hub 18 thus decelerate or prevent motion of the trailer on which brake 10 is mounted. Belt 20 provides an endless flexible friction ring between the cores which is commercially available from Goodyear Tire and Rubber Co. as catalog No. 8-IR-38U-MP. Stationary core 12 is mounted by a suitable fastener (not shown) in fixed relation to the non-rotary axle housing or other similar structure of the axle assembly (not shown) and if axle 16 is a live or rotary axle the same is journaled for free rotation in core 12 by a brass bushing 22. If axle 16 is non-rotatable and hub 18 is journalled thereon by suitable wheel bearings, then core 12 is preferably welded directly to axle 16. Moveable core 14 is mounted on hub 18 for rotation therewith and for generally axial movement toward and away from stationary core 12 by a plurality of circumferentially spaced cylindrical guide pins 23 which slide in complementary, cylindrical pockets 25 in core 14. Pins 23 are pressed into holes through bosses 24 on the inner face of a wheel mounting flange 26 of hub 18. Bosses 24 are integral with wheel flange 26 and provide positive stops limiting the movement of core 14 away from core 12. Flange 26 is integral with hub 18 and mounts a wheel and tire assembly (not shown) on the hub. Guide pins 23 and the associated pockets 25 may have tapering surfaces in planes radially of the hub converging toward core 12 to develop a camming action tendency to force core 14 toward core 12 in response to restraining torque exerted on core 14 by core 12 via belt 20. A servo or self-energizing action is also obtained by the tendency of belt 20 to be drawn deeper into groove 31 when it is squeezed between the stationary and rotary friction surfaces 30 and 28.

Cores 12 and 14 are made of a magnetic material such as steel or cast iron and have a generally cylindrical shape with opposed, inclined friction surfaces 28 and 30 providing an annular groove 31 of V-shape or frusto-conical cross section between their outer peripheral surfaces which receives endless belt 20. Belt 20 is retained on stationary core 12 by a radial flange 32 having an outside diameter slightly larger than the free state inside diameter of belt 20. The bottom of groove 31 is defined by a cylindrical surface 33 in core 12 extending axially between surface 30 and flange 32 and having a diameter preferably .003 inches less than the free state inside diameter of belt 20. Surface 28 is formed on the end of an annular rib 35 of core 14 which axially overlaps and has a radial clearance with flange 52. An electromagnet to move core 14 is provided by core 12 and a coil 32 of an electrically conductive wire with lead lines 34 received endwise and fixed in an annular groove 36 in stationary core 12. Core 14 is moved toward core 12 and into engagement with belt 20 by an electromagnetic field produced by coil 32 acting primarily on a circular rib 38 of core 14 extending with a clearance into groove 36, closely adjacent to coil 32. The wearing away of endless belt lining 20 by use of brake 10 is automatically adjusted or compensated for by the arrangement of the generally opposed friction surfaces 28 and 30 urged into engagement with the belt by the electromagnet.

Lead lines 34 of coil 32 are connected through suitable control circuitry to a source of electrical energy, such as the 12 volt battery of the towing vehicle. To operate brake 10, coil 32 is energized by the control circuitry which creates a magnetic field attracting core 14 axially toward core 12 and urging surfaces 28 and 30 into firm frictional engagement with endless belt 20, thereby retarding or preventing rotation of hub 18 and core 14 in relation to stationary core 12 and thus braking the vehicle on which the braking device 10 is mounted. The brake is released by de-energizing coil 32 which allows moveable core 14 to shift axially away from stationary core 12 and disengage from endless belt 20. In practice, it has been found that when coil 32 is de-energized core 14 will remain disengaged or slightly spaced from belt 20 when core 14 is rotating. However, if desired, core 14 can be yieldably biased away from stationary core 12 by any convenient means such as a coil spring 40, which is housed in the annular cavity 42 of hub 12 and butted between a radial wall 44 of cavity 42 and the end surface on annular rib 46 of core 14. A suitable wear ring 48 may be secured to the end turn of spring 40 to slide against rib 46. The axially overlap of ribs 35, 38, and 46 of core 14 with the concentric annular ribs 50 and 52 of core 12 provides an efficient flux return path for coil 32 which increases the magnetic coupling between the cores, and hence the field strength and concomitant attractive forces, as core 14 moves closer to core 12.

The use of an endless belt of lining material received between friction surfaces which can be moved into firm engagement with the belt provides a compact and highly efficient braking device which is of economical manufacture and assembly. The endless belt and opposed friction surfaces automatically compensate for wear of the belt and thus the brake is substantially maintenance free.

I claim:

1. A braking device adapted for use in a vehicle having an axle and a wheel hub on the axle comprising first and second cores each having a friction surface in generally opposed, spaced relation forming an annular recess having a generally V-shape cross section, an endless belt with a generally V-shape cross section providing a ring of friction material received in said annular recess between said opposed surfaces, an electromagnet received in one of said cores and adapted to move said cores toward each other and said opposed friction surfaces into firm frictional engagement with said endless belt when energized, one of said cores being adapted for mounting such that it does not rotate with respect to the vehicle, the other of said cores being adapted for connection with the wheel hub for rotation therewith, and one of said cores also being mounted for generally axial movement toward and away from the other of said cores.

2. The braking device of claim 1 in which said cores are generally cylindrical and one of said cores encircles the axle and the other of said cores is concentric with and mounted on a flange of the wheel hub.

3. The braking device of claim 1 in which said electromagnet comprises a coil of electrically conductive wire encircling the axle and mounted in an annular groove in said one core and in which said other core has an annular rim extending generally axially into said groove adjacent to said coil of wire.

4. The braking device of claim 2 in which said electromagnet comprises a coil of electrically conductive wire encircling the axle and mounted in an annular groove in said one core and in which said other core has an annular rim extending generally axially into said groove adjacent to said coil of wire.

5. The braking device of claim 1 in which one of said cores has means retaining said endless belt on said core when at least one of said opposed friction surfaces is disengaged from said endless belt.

6. The braking device of claim 2 in which one of said cores has means retaining said endless belt on said core when at least one of said opposed friction surfaces is disengaged from said endless belt.

7. The braking device of claim 3 in which one of said cores has means retaining said endless belt on said core when at least one of said opposed friction surfaces is disengaged from said endless belt.

8. The braking device of claim 7 in which said retaining means of said one core comprises a generally radially extending circumferential flange spaced from said friction surface of said one core and adapted to retain said endless belt on said one core when at lease one of said friction surfaces is disengaged from said endless belt.

9. A braking device for a vehicle comprising a wheel hub, first and second cores each having a friction surface thereon with the surfaces in opposed spaced relation forming an annular recess with a generally V-shape cross section, an endless belt with a generally V-shape cross section providing a ring of friction material received in said annular recess between said opposed surfaces, one of said cores being concentric with and carried by said wheel hub for rotation therewith and generally axial movement in relation thereto toward and away from the other of said cores, the other of said cores being generally co-axial with said hub and adapted for mounting in a stationary position with respect to the vehicle, and an electromagnet received in said one core and adapted when energized to move said cores toward each other and said friction surfaces into firm engagement with said endless belt.

10. The braking device of claim 9 in which said one core is adapted to journal for free rotation an axle adapted for connection to said hub.

11. The braking device of claim 10 further including an axle connected to said hub and journaled for free rotation in said one core.

* * * * *

UNITED STATES PATENT OFFICE
CERTIFICATE OF CORRECTION

PATENT NO. : 3,734,245

DATED : May 22, 1973

INVENTOR(S) : Harold C. Hubbard

It is certified that error appears in the above-identified patent and that said Letters Patent are hereby corrected as shown below:

The reference numeral "32" where it appears at the top of the single figure of the drawings (between reference numerals "20" and "14") should be changed to --52--.

Column 1, line 67 - "32" should be --52--

Column 2, line 2 - "32" should be --52--

Signed and Sealed this thirtieth Day of March 1976

[SEAL]

Attest:

RUTH C. MASON
Attesting Officer

C. MARSHALL DANN
Commissioner of Patents and Trademarks